United States Patent [19]

Madaj et al.

[11] Patent Number: 5,514,723
[45] Date of Patent: May 7, 1996

[54] WATER-BLOWN INTEGRAL SKIN POLYURETHANE FOAMS AND CATALYSTS USEFUL THEREIN

[75] Inventors: Edmund J. Madaj, Imperial; Kurt E. Walter, Pittsburgh, both of Pa.

[73] Assignee: Bayer Corporation, Pittsburgh, Pa.

[21] Appl. No.: 533,982

[22] Filed: Sep. 26, 1995

[51] Int. Cl.$^6$ ............................. C08G 18/18; C08G 18/24
[52] U.S. Cl. .............................. 521/51; 521/121; 521/126; 521/127; 521/129
[58] Field of Search ............................. 521/51, 121, 126, 521/127, 129

[56] References Cited

U.S. PATENT DOCUMENTS

| | | | |
|---|---|---|---|
| 3,822,223 | 7/1974 | Gemeinhardt et al. | 260/2.5 AC |
| 4,119,585 | 10/1978 | Kenney et al. | 521/118 |
| 5,132,329 | 7/1992 | Lynch et al. | 521/51 |
| 5,166,183 | 11/1992 | Franyutti et al. | 521/51 |
| 5,216,035 | 6/1993 | Harrison et al. | 521/51 |
| 5,284,880 | 2/1994 | Harrison et al. | 521/51 |
| 5,300,532 | 4/1994 | Takimoto et al. | 521/51 |
| 5,338,820 | 8/1994 | Harrison et al. | 528/67 |

*Primary Examiner*—Morton Foelak
*Attorney, Agent, or Firm*—Joseph C. Gil

[57] ABSTRACT

The present invention is directed to an integral skin foam prepared by reacting an isocyanate, an isocyanate reactive component and water as the only blowing agent and to a catalyst useful therein. The catalyst broadly comprises a diorganotin sulfide, a tertiary amine and a tin compound other than a diorganotin sulfide.

4 Claims, No Drawings

WATER-BLOWN INTEGRAL SKIN POLYURETHANE FOAMS AND CATALYSTS USEFUL THEREIN

BACKGROUND OF THE INVENTION

The purpose of the present invention was to produce an integral skin foam using water as the sole blowing agent, while still retaining the dense, largely noncellular surface layer characteristic of foams blown with organic blowing agents.

Water-blown integral skin polyurethane foams are known in the art. See, e.g., U.S. Pat. Nos. 5,132,329, 5,166,183, 5,216,035, 5,284,880, 5,300,532 and 5,338,820. In general, such foams are prepared by reacting isocyanates with polyols in the presence of water. With most combinations of catalysts, water-blown foams have uniform properties throughout. In other words, the physical properties measured at the surface of the molded product are very nearly the same as those measured on foam in the core of the molded product.

The use of diorganotin sulfides in combination with tertiary amine catalysts to produce polyurethane foams is described in U.S. Pat. Nos. 3,822,223 and 4,119,585.

DESCRIPTION OF THE INVENTION

The present invention is directed to a catalyst combination for use in the preparation of water-blown integral skin polyurethane foams and to an improved process for the preparation of an integral skin foam by reacting an organic isocyanate with an active hydrogen group containing material in the presence of a catalyst and a blowing agent in a closed mold. The improvement resides in using the following catalyst combination:

a) from about 4 to about 82% by weight (and preferably from 15 to 80% by weight) of a diorganotin sulfide of the formula:

$$[R^1R^2SnS]_x$$

where $R^1$ and $R^2$, can be the same or different and are individually selected from the group consisting of alkyl containing from 1 to 20 carbon atoms, cycloalkyl, anyl, aralkyl, and alkaryl, and x is an integer of from 1 to 4, b) from about 14 to about 94% by weight (and preferably from 35 to 80% by weight) of a tertian/amine, and c) from about 4 to about 25% by weight (and preferably from 5 to 20% by weight) of a tin compound capable of catalyzing the reaction between an isocyanate group and an active hydrogen atom, with the proviso that said tin compound is not a diorganotin sulfide of the above noted formula, and with further proviso that the amounts of components a), b) and c) total 100%.

The present invention is based upon the discovery that incorporation of the diorganotin sulfide, in combination with the tertiary amine and the other tin compound will produce foams with significant densification at the surface as measured by the ratio of the tensile strength of the surface layer of the molded foam to the tensile strength of the foam in the interior of the molded foam. In determining this ratio of tensile strengths, ASTM D-412 was used. According to this test method, a sample is prepared by molding the polyurethane foam-forming reaction mixture into an 8 inch by 8 inch by one inch panel. The panel is then cut into strips one inch in width (the dimensions of each strip are 8 inches by 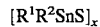 1 inch by 1 inch). The skin sample is obtained by cutting the top 0.25 inch and die cutting tensile bars from those strips. The core samples are obtained in the same way, except that they are cut from the second 0.25 inch of the panel.

The use of the catalyst combination of the present invention also has the advantage of improving the efficiency of the blowing reaction (i.e., the reaction between water and isocyanate to generate carbon dioxide), with the result that it is possible to produce molded foams at lower densities than would otherwise be possible with a given amount of water.

The catalyst combination of the present invention requires the use of a diorganotin sulfide, a tertiary amine and a tin compound capable of catalyzing the reaction between an isocyanate group and an active hydrogen atom, with the proviso that the tin compound is not a diorganotin sulfide of the above noted formula.

The diorganotin sulfides useful herein are known. They are of the general formula:

$$[R^1R^2SnS]_x$$

where $R^1$ and $R^2$, can be the same or different and are individually selected from the group consisting of alkyl containing from 1 to 20 carbon atoms, cycloalkyl, aryl (preferably phenyl), aralkyl, and alkaryl, and x is an integer of from 1 to 4. Tin compounds of the above formula are described in U.S. Pat. Nos. 3,822,223 and 4,119,585, the disclosures of which are herein incorporated by reference. $R^1$ and $R^2$ are preferably alkyl groups of from 1 to 12 carbon atoms. In addition, the alkyl portions of the aralkyl and alkaryl groups contain 1 to 12 carbon atoms. $R^1$ and $R^2$ are most preferably selected from the group consisting of methyl, butyl, and octyl. Specific useful materials include dimethyl tin sulfide, diethyl tin sulfide, methylethyl tin sulfide, dipropyl tin sulfide, methylpropyl tin sulfide, diisopropyl tin sulfide, dibutyl tin sulfide, ethylbutyl tin sulfide, dioctyl tin sulfide, methyloctyl tin sulfide, diheptyl tin sulfide, dihexadecyl tin sulfide, dioctadecyl tin sulfide and the like. Dibutyl tin sulfide is presently most preferred.

Any tertiary amine for catalyzing the reaction between isocyanates and active hydrogen containing compounds is suitable for use in the present invention. These include: triethylene diamine ("Dabco"); N-methylmorpholine; N-ethylmorpholine; triethylamine; N-methyldiethanolamine; N,N-diethyl- and dimethylaminoethanol; triethanolamine; tetramethylguanidine; N,N,N',N'-tetramethylethylenediamine; N,N-dimethyl-$C_{10}$–$C_{16}$amine; N,N-dimethylcyclohexylamine; N,N-dimethylpiperazine; 1,2,4-trimethylpiperazine; bis-(β-dimethylaminoethyl)-ether; tributylamine; N-cocomorpholine; N-methyl-N'-dimethylaminoethyl-piperazine; N,N-dimethylbenzylamine; bis(N,N-diethylaminoethyl)-adipate; N,N-diethylbenzylamine; pentamethyldiethylene triamine; N,N,N',N'-tetramethyl-1,3-butane diamine; N,N-dimethyl-β-phenylethylamine; 1,2-dimethylimidazole; 2-methylimidazole; pyridine; and the like.

Any tin compound capable of catalyzing the reaction between an isocyanate group and an active hydrogen atom, with the proviso that the tin compound is not a diorganotin sulfide of the above noted formula, can be used. The useful tin compounds include stannous salts and dialkyl tin salts of carboxylic acids having from 1 to 18 carbon atoms, dialkyl and trialkyl tin oxides and dialkyl tin chlorides. Suitable tin salts include stannous oleate, stannous octoate, stannous stearate, stannous acetate and the like. These stannous salts are generally known in the art and are disclosed, for example, in U.S. Pat. Nos. 3,397,158 and 3,347,804. Suitable dialkyl tin salts include essentially any of those known and used in the art. Suitable dialkyl tin salts include dibutyl tin diacetate, dibutyl tin diformate, dimethyl tin adipate, dibutyl tin maleate, dipropyl tin diacetate, diethyl tin diformate, dipropyl tin dioleate, dipropyl tin dipropionate, diamyl tin dipropionate, dioctyl tin diacetate, dibutyl tin dilaurate, dibutyl tin dioctoate, and the like. These dialkyl tin salts are also generally known in the art and are disclosed, for example, in U.S. Pat. Nos. 3,397,158 and 3,822,223. Also useful are trialkyl tin oxides, dialkyl tin oxides and dialkyl tin chlorides. The alkyl groups of these materials may contain from 1 to 8 carbon atoms. Examples of such compounds include tributyl tin oxide, trioctyl tin oxide, dibutyl tin oxide, dipropyl tin oxide, dibutyl tin chloride, dioctyl tin chloride, dipropyl tin chloride, and the like. The trialkyl tin oxides can be more accurately referred to as bis(trialkyl tin) oxides. Finally, any of the tin compounds described in U.S. Pat. No. 4,119,585 which are not of the above noted formula can also be used.

In preparing the integral skin foam of the present invention, substantially any organic polyisocyanate and substantially any active hydrogen containing material can be used.

The presently preferred isocyanate is an isocyanate having an isocyanate group content of from about 16 to about 22% by weight, and preferably from about 18 to about 20% by weight, prepared by reacting:

(i) from about 40 to about 60, and preferably from about 50 to about 60 parts by weight of methylenebis(phenyl isocyanate), (ii) from 0 to about 10, and preferably from about 4 to about 8 parts by weight of a carbodiimide group modified methylenebis(phenyl isocyanate) having an isocyanate group content of from about 24 to about 33, and preferably from about 28 to about 31% by weight, and (iii) from about 30 to about 50, and preferably from about 35 to about 41 parts by weight of a polyester diol having a molecular weight of from about 1000 to about 3000, and preferably from about 1500 to about 2500, with the amounts of (i), (ii) and (iii) totalling 100 parts by weight.

As used herein, the term, methylenebis(phenyl isocyanate), is intended to include the 2,2'-isomer, the 2,4'-isomer, the 4,4'-isomer, and mixtures thereof.

The preferred isocyanate is known, and is described in U.S. Pat. Nos. 4,986,929 and 5,166,183, the disclosures of which are herein incorporated by reference.

The carbodiimide group modified methylenebis(phenyl isocyanates) used to prepare the isocyanate are known in the art. The preparation of such carbodiimide modified isocyanates is described in U.S. Pat. Nos. 3,384,653 and 4,154,752, the disclosures of which are herein incorporated by reference.

The polyesters useful in preparing the isocyanate are also generally known in the polyurethane art. Typically, such polyesters are reaction products of dihydric alcohols and dibasic carboxylic acids. Instead of the free acid, the corresponding anhydride may be used. The acids may be aliphatic, cycloaliphatic, aromatic or heterocyclic. Useful acids include succinic acid, adipic acid, suberic acid, azelaic acid, sebacic acid, phthalic acid, isophthalic acid and the like. Useful dihydric alcohols include ethylene glycol, 1,2- and 1,3-propylene glycol, 1,4- and 2,3-butane diol, 1,6-hexane diol, 1,8-octane diol, neopentyl glycol, cyclohexanedimethanol and the like.

The most preferred isocyanate is an isocyanate having an isocyanate group content of about 19% by weight prepared by reacting:

(i) 56 parts by weight of the 4,4'-isomer of methylenebis(phenyl isocyanate), (ii) 6 parts by weight of a carbodiimide modified methylenebis(phenyl isocyanate) having an isocyanate group content of 29.3% and a viscosity at 25° C. of less than 100 mPa.s (commercially available from Bayer Corporation as Mondur CD), and (iii) 38 parts by weight of a 2000 molecular weight polyester diol prepared by reacting adipic acid, 1,4-butane diol and ethylene glycol (ethylene glycol to butane diol molar ratio of about 1:1).

This preferred isocyanate component is commercially available from Bayer Corporation as Mondur E-501.

While substantially any active hydrogen containing material can be used, it is most preferred to use an active hydrogen group containing material consisting essentially of:

1) from about 10 to about 90 parts by weight of a polyether diol having an OH number of from about 20 to about 40, having an ethylene oxide content of from about 20 to about 40% by weight, and with from about 90 to about 100% of its hydroxyl groups being primary OH groups, 2) from about 5 to about 90 parts by weight of a polyether polyol having an OH number of from about 20 to about 40, and an average OH functionality of from 2.5 to 3;

3) from about 5 to about 15 parts by weight of 1,4-butane diol; and 4) from about 0.5 to about 10 parts by weight of ethylene glycol, with the amounts of 1), 2), 3), and 4) totaling 100 parts by weight.

C) the blowing agent consists solely of water.

The preferred active hydrogen group containing component of the present invention consists essentially of a blend of several different components. The first component is a polyether diol having an OH number of from about 20 to about 40 (preferably from about 25 to about 35), having an ethylene oxide content of from about 20 to about 40% by weight (preferably from about 30 to about 40% by weight), and with from about 90 to about 100% of its hydroxyl groups being primary OH groups (and preferably from about 95 to about 100% primary OH groups).

The second component of the preferred active hydrogen containing blend is a polyether polyol having an OH number of from about 20 to about 40 (preferably from about 25 to about 35), and having an average OH functionality of from 2.5 to 3.

The polyethers suitable for use in accordance with the invention are known and may be obtained, for example, by polymerizing epoxides such as ethylene oxide, propylene oxide, butylene oxide, tetrahydrofuran, styrene oxide or epichlorohydrin in the presence of $BF_3$ or by chemically adding these epoxides, preferably ethylene oxide and propylene oxide, in admixture or successively to components containing reactive hydrogen atoms such as water, alcohols or amines. Examples of alcohols and amines include low molecular weight diols and triols, water, aniline, ammonia, and ethanolamine. It is preferred to use polyethers which contain substantial amounts of primary hydroxyl groups in terminal positions (up to 90% by weight, based on all of the terminal hydroxyl groups present in the polyether).

"Filled" polyethers, such as those modified by vinyl polymers, of the type formed, for example, by polymerizing styrene or acrylonitrile in the presence of polyether (U.S. Pat. Nos. 3,383,351; 3,304,273; 3,523,093; and 3,110,695; and German Patent 1,152,536), are also surfable, as are polybutadienes containing OH groups. In addition, filled polyether polyols which contain high molecular weight polyadducts or polycondensates in finely dispersed form or in solution may be used. Such modified polyether polyols are obtained when polyaddition reactions (e.g., reactions between polyisocyanates and amino functional compounds)

or polycondensation reactions (e.g., between formaldehyde and phenols and/or amines) are directly carried out in situ in the polyether polyols. Typical of useful filled polyethers are described in U.S. Pat. Nos. 4,448,903 and 4,477,602.

Both ethylene glycol and 1,4-butane diol are also essential for the most preferred embodiment of the present invention.

The amount of the catalyst combination of the present invention used in preparing the integral skin foams herein is such that i) the amount of diorganotin sulfide of the above formula is from about 0.02 to about 0.5 percent by weight based on the total weight of all the isocyanate reactive materials, ii) the amount of tertiary amine is from about 0.05 to about 1.0 percent by weight based on the total weight of all the isocyanate reactive materials, and iii) the amount of other tin compound is from about 0.01 to about 0.1 percent by weight based on the total weight of all the isocyanate reactive materials.

It is also possible to use surface-active additives such as emulsifiers and foam stabilizers. Examples include N-stearyl-N',N'-bishydroxyethyl urea, oleyl polyoxyethylene amide, stearyl diethanoi amide, isostearyl diethanolamide, polyoxyethylene glycol monoleate, a pentaerythritol/adipic acid/oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may also be used as surface-active additives.

Suitable foam stabilizers include water-soluble polyether siloxanes. The structure of these compounds is generally such that a copolymer of ethylene oxide and propylene oxide is attached to a polydimethyl siloxane radical. Such foam stabilizers are described in U.S. Pat. No. 2,764,565. In addition to the catalysts and surface-active agents, other additives which may be used in the molding compositions of the present invention include known release agents, cell regulators, flame retarding agents, plasticizers, dyes, fillers and reinforcing agents such as glass in the form of fibers or flakes or carbon fibers.

Water is used as the sole blowing agent. In general, the amount of water used can vary over wide limits. Typically, the amount of water used ranges from 0.1 to 1.0 part per 100 parts of isocyanate reactive component.

The molded products of the present invention are prepared by reacting the components in a closed mold. The compositions according to the present invention may be molded using conventional processing techniques at isocyanate indexes ranging from as low as 90 to as high as 400 (preferably from 95 to 115) and are especially suited for processing by the RIM process. In general, two separate streams are intimately mixed and subsequently injected into a suitable mold, although it is possible to use more than two streams. The first stream contains the isocyanate component, while the second stream contains the isocyanate reactive components and any other additive which is to be included.

The invention is further illustrated but is not intended to be limited by the following examples in which all parts and percentages are by weight unless otherwise specified.

EXAMPLES

In the examples, the following materials were used:

POLYOL A: a polyether diol, having an OH number of about 28, prepared from propylene glycol, propylene oxide, and ethylene oxide, the weight ratio of propylene oxide to ethylene oxide being 70:30, with about 100% of the OH groups being primary;

POLYOL B: a dispersion having an OH number of about 28 and consisting of a polyhydrazodicarbonamide in a glycerin initiated propylene oxide/ethylene oxide polyether (having an OH number of about 35, with propylene oxide to ethylene oxide weight ratio of about 5:1) and produced by reacting toluene diisocyanate and hydrazine in the presence of the glycerin initiated polyether as described in U.S. Pat. No. 4,042,537: the dispersion has a solids content of 20% by weight;

XB: 1,4-butane diol;

EG: ethylene glycol;

33LV: Dabco 33LV, a solution of 33% triethylene diamine in 67% dipropylene glycol, commercially available from Air Products;

T-12: dibutyltin dilaurate;

1028: Dabco 1028, a tertiary amine catalyst commercially available from Air Products, consisting of 30% amine and 70% 1,4-butane diol;

WATER

S-25: Dabco S-25, a 1:3 mixture of triethylene diamine in XB, commercially available from Air Products;

UL-1: a commercially available dibutyltin dilauryl mercaptide from Witco;

UL-32: a commercially available dioctyltin dilauryl mercaptide from Witco;

DBTS: dibutyl tin sulfide

L-5309: a commercially available polyalkyleneoxidedimethylsiloxane copolymer available from OSi Specialties, Inc.

ISO: an isocyanate having an isocyanate group content of about 19% by weight prepared by reacting:

(i) 56 parts by weight of the 4,4'-isomer of methylenebis(phenyl isocyanate), (ii) 6 parts by weight of a carbodiimide modified methylenebis(phenyl isocyanate) having an isocyanate group content of 29.3% and a viscosity at 25° C. of less than 100 mPa.s, and (iii) 38 parts by weight of a 2000 molecular weight polyester diol prepared by reacting adipic acid, 1,4-butane diol and ethylene glycol (ethylene glycol to butane diol molar ratio of about 1:1);

In the examples, the following procedure was used to prepare the foams. In each instance, a Kymofoam Type KF-IS-202 foam machine was used under the following conditions:

a) the temperature of both the A-side and the B-side was about 30° C., b) the mold temperature was about 50° C., c) throughput was about 60 gm/sec, d) the isocyanate index was 98, and e) the A-side was ISO while the B-side were the rest of the components listed in the following Table 1.

The components in Table 1 were mixed in the proportions set forth in Table 1. Five gallon lots were made of each of the mixtures. Free-rise densities were determined by pouring about 120 grams of liquid reaction mixture (i.e., A-side and B-side) into an empty paper cup having a volume of 473 cc. The reaction mixture was allowed to foam up in the cup and cure. The top of the foam was then cut off flush with the top of the cup using a band saw and the cup plus foam was weighed. The foam weight in grams divided by the 473 cc gives the free-rise density reported.

Model parts were made by pouring the liquid reaction mixture into a 20.3 cm×20.3 cm×2.54 cm (8 inch by 8 inch by 1 inch) aluminum plaque mold and demolding in about 3 and one half minutes. The parts were tested for tensile strength by ASTM D-412, with the results reported in Table 2. The densities reported in Table 2 were obtained by measuring the mass (in grams) of the molded part and dividing the mass by the volume of the mold in cubic centimeters.

Examples 1 and 3 are comparative examples.

TABLE I

|  | Example 1 | Example 2 | Example 3 | Example 4 | Example 5 |
|---|---|---|---|---|---|
| POLYOL A | 73.71 | 73.71 | 73.71 | 73.71 | 72.95 |
| POLYOL B | 14.43 | 14.43 | 14.43 | 14.43 | 14.43 |
| XB | 8.5 | 8.5 | 8.5 | 8.5 | 9.1 |
| EG | 0.97 | 0.97 | 0.97 | 0.97 | 0.97 |
| 33LV |  |  |  |  | 0.16 |
| S-25 | 0.8 | 0.8 | 0.8 | 0.8 |  |
| 1028 | 0.21 | 0.21 | 0.21 | 0.21 | 0.21 |
| T-12 |  |  | 0.03 | 0.03 |  |
| UL-1 | 0.03 | 0.03 |  |  |  |
| UL-32 |  |  |  |  | 0.02 |
| DBTS |  | 0.06 |  | 0.06 | 0.05 |
| L-5309 | 0.7 | 0.7 | 0.7 | 0.7 | 0.7 |
| WATER | 0.4 | 0.4 | 0.35 | 0.35 | 0.45 |
| Free-rise density | 0.34 g/cc | 0.21 g/cc | 0.33 g/cc | 0.28 g/cc | 0.22 g/cc |

TABLE 2

|  | Example 1 | Example 2 | Example 3 | Example 4 | Example 5 |
|---|---|---|---|---|---|
| Density, | 0.51 g/cc | 0.5 g/cc | 0.53 g/cc | 0.44 g/cc | 0.56 g/cc |
| Skin Tensile Strength | 369.9 psi | 479.3 psi | 551.2 psi | 410.1 psi | 496.7 psi |
| Core Tensile Strength | 313.6 psi | 302.9 psi | 442.6 psi | 275.7 psi | 219.2 psi |
| Tensile Str ratio (Skin:Core) | 1.18 | 1.58 | 1.25 | 1.49 | 2.27 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for the preparation of an integral skin foam by reacting an organic isocyanate with an active hydrogen group containing material in the presence of a catalyst and water as the blowing agent in a closed mold, the improvement of said catalyst comprises:

a) from about 4 to about 82% by weight of a diorganotin sulfide of the formula:

$[R^1R^2SnS]_x$ where $R^1$ and $R^2$, can be the same or different and are individually selected from the group consisting of alkyl containing from 1 to 20 carbon atoms, cycloalkyl, aryl, aralkyl, and alkaryl, and x is an integer of from 1 to 4, b) from about 14 to about 94% by weight of a tertiary amine, and c) from about 4 to about 25% by weight of a tin compound capable of catalyzing the reaction between an isocyanate group and an active hydrogen atom, with the proviso that said tin compound is not a diorganotin sulfide of the above noted formula, and with further proviso that the amounts of components a), b) and c) total 100%.

2. The process of claim 1, wherein component a) comprises from 15 to 80% by weight, component b) comprises from 35 to 85% by weight and component c) comprises from 5 to 20% by weight.

3. The process of claim 1, wherein $R^1$ and $R^2$ are alkyl groups of from 1 to 12 carbon atoms.

4. The process of claim 1, wherein component a) is dibutyl tin sulfide.

* * * * *